Feb. 10, 1931.                S. C. HORN                1,791,563
                      ELECTRICAL SEMIPOTENTIOMETER
                         Filed Nov. 17, 1928
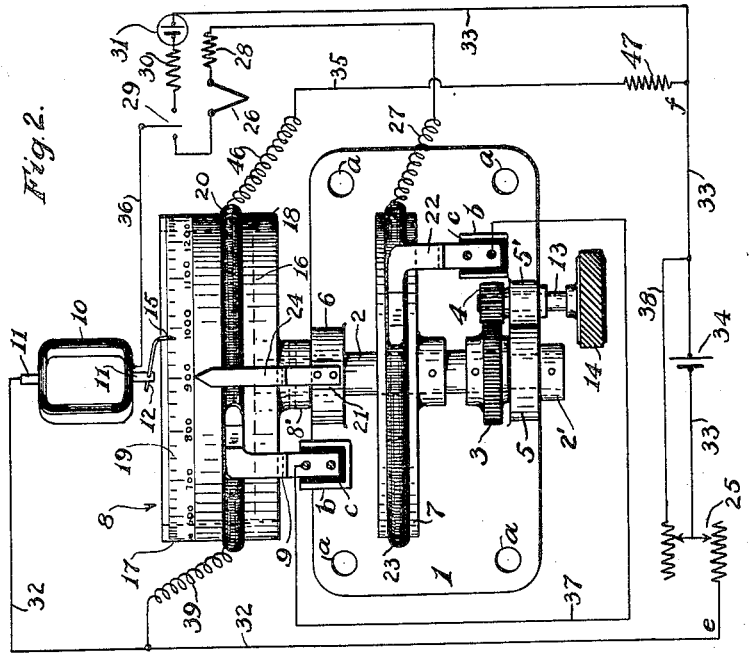
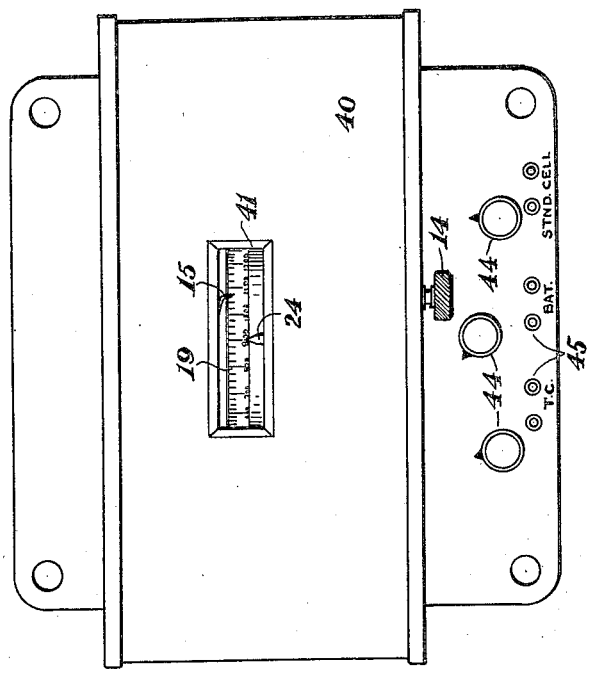
INVENTOR
Sidney C. Horn
BY
Harold D. Penney   ATTORNEY Patented Feb. 10, 1931

1,791,563

UNITED STATES PATENT OFFICE

SIDNEY C. HORN, OF MOUNT VERNON, NEW YORK, ASSIGNOR TO WILSON-MAEULEN COMPANY, INC., OF NEW YORK, N. Y., A CORPORATION OF NEW YORK

ELECTRICAL SEMIPOTENTIOMETER

Application filed November 17, 1928. Serial No. 320,124.

The present invention relates to electrical measuring instruments and has particular reference to an indicating type of potentiometer, especially to those potentiometer indicators employing thermocouples and which may be used for measuring temperature, although it is not limited to use for temperature measurements only.

As is well known, in prior null method, potentiometric measuring instruments, the deflecting galvanometer and its associated deflection scale are distinct from, and usually separately mounted away from the adjustable slide wire and its integrant, calibrated, measuring scale.

In instruments of the above character, it is manifest that the observer can only obtain readings by manual adjustment of the slide wire, and be guided in such adjustment by optical observation of the galvanometer pointer and the zero markings on its associated scale.

This operation of observing the galvanometer, while adjusting the slide wire, elsewhere, until the galvanometer shows no deflection, and then transferring visual observation to the calibrated slide wire dial, to note the reading or measurement, is inconvenient, especially when the galvanometer deflection scale is uncalibrated, as is usually the case. Readings, under such circumstances, can only be taken from the slide wire calibrated scale, and then only when the slide wire has been so adjusted as to bring the galvanometer to zero (balance) or index of no deflection on its scale. Again, since the galvanometer deflection is uncalibrated, except as to the fixed index of no deflection, the amount of error cannot be observed.

Now, instruments known as "semi-potentiometers" or "deflection potentiometers" employ a calibrated galvanometer scale. That is to say, both the galvanometer and slide wire scales are calibrated. Also, it is customary, and to a considerable extent necessary, to have an additional compensating slide wire to compensate for changes in resistance of the galvanometer circuit. Thus, approximately exact readings can be taken without adjusting the slide wire and without bringing the galvanometer to zero, or point of no deflection. In this case, however, the operation involves the observation of both scales and involves a calculation, as well. A reading must first be taken from the calibrated slide wire scale, at its index point, then a reading must be taken from the galvanometer deflection scale, and the latter reading added to or deducted from the reading on the slide wire scale.

When measuring only electrical voltage, such a customary type of semi-potentiometer, may have no greater disadvantages than those stated above. But when the voltage is being measured as the indirect means of measuring some other physical properties, such as temperature, there is still another objection.

This latter objection is due to the fact that the voltage and the variable being indirectly measured may not have proportional values.

For example, the above objection occurs in the case of a platinum-rhodium thermocouple, in measuring temperatures in pyrometry, where the relation between degrees of temperature and voltage delivered by the thermocouple is approximately a parabolic relation. Such an instrument calibrated therefore in degrees of temperature, in accordance with the thermo-electric characteristics of a platinum-rhodium couple, would have unequal scale divisions on the slide wire scale, and any scale divisions determined upon for the galvanometer scale would only be appropriate for one setting of brush on the slide wire.

I have therefore designed and re-arranged the above types of instruments as to eliminate the objections noted, and to permit, substantially, of a joint reading. In my improved instrument there is made possible the use of a single, dual purpose, calibrated scale, for combined and instant slide wire calibration and galvanometer calibration and reading. At the same time the novel design permits this single scale to have calibrations either in terms of voltage or of the values indirectly measured through measuring voltage.

For example, when my improved instrument is used with a platinum-rhodium thermocouple, the novel, single, dual purpose scale would have the appropriate spacings of the graduations in accordance with the thermo-electric characteristics of the thermocouple for which the instrument is calibrated.

Yet such calibrations would be accurate both for adjustments of brush on primary slide wire, and for deflections of the galvanometer. Thus, it is possible by my novel design to make adjustments of the brush on the primary slide wire to follow roughly the voltage being measured, and permit the final reading to be taken from the same identical scale according to the pointer of the galvanometer as indexed, irregardless of the position the brush occupies on the primary slide wire.

The present invention, then, permits the observer either to bring the galvanometer readings to a permanent zero point, and take the final readings from the slide wire index on the single scale which would give a reading by the customary null method of potentiometers, in general; or, the observer can simply alter the relation of primary slide wire and brush to bring the galvanometer pointer into the field of vision and take the reading on the single scale, from the galvanometer pointer, as indexed.

Accordingly, one of the main objects of my present invention is to provide an eleectrical measuring instrument of the semi-potentiometer type in which the two customarily separate slide wire and galvanometer scales are combined into a single scale, thereby to facilitate a reading of momentary value indicated on the scale, when the latter is under direct observation.

Another important object of this invention is to provide a potentiometric electrical measuring instrument in which a reading can be taken directly from the scale at the position of the galvanometer pointer, regardless of whether or not the slide wire is exactly adjusted to bring the galvanometer to zero, or point of no deflection.

Another object of the invention is to provide an indicating potentiometer in which the scale of a deflecting galvanometer is made identical with the calibrated adjustable slide wire scale, so that the calibrated slide wire scale also acts with sufficient precision in practice as a calibrated deflection scale for the galvanometer, and so that the slide wire scale fixed index coincides with the zero, or point of no deflection of the galvanometer.

Another object of the invention is to provide a potentiometer in which the galvanometer is so connected as to electrical polarity, that when the calibrated slide wire is out of adjustment, the galvanometer will deflect on the calibrated scale from the fixed index, in a direction that will tend to properly add or subtract the equivalent value of the slide wire misadjustment, when the reading is taken from the position of the galvanometer pointer on the scale instead of from the fixed index.

Another object of the invention is to provide a poteniometric instrument in which the operator, or user, may adjust the slide wire and its integrant scale until the galvanometer stands at no deflection and the galvanometer pointer coincides with the fixed index, thus giving an exact reading at that point, and thereafter the operator or user may observe and read direct from the scale at the position of the galvanometer pointer, actual temperatures, even when there are minor variations of the electrical values being measured, without further slide wire adjustment.

Another object of the invention is to provide a novel instrument of the compensating slide wire, deflection potentiometer type, in which a single calibrated scale serves for both slide wire and galvanometer scales, and moves as a unit, either with the primary slide wire or the brush for the slide wire, and the scale, being movable with respect to the galvanometer pointer, such as the index, is mounted as a circular band, to be rotated, or as a strip scale to be moved back and forth longitudinally.

And other objects of the invention are to improve generally the simplicity and efficiency of such devices and to provide a device or apparatus of this kind which is economical, durable and reliable in operation, and economical to manufacture.

The inventive features for the accomplishment of these and other objects are shown herein, in one preferred embodiment, in connection with an improved potentiometer which, briefly stated, includes a vertical rotatable shaft and support therefor, a circular index support mounted thereon for movement with said shaft, an index scale mounted on said index support, said scale having indicia thereon representing predetermined divisions or units and values of the physical property being measured, an electrical resistance associated with said scale and adapted to function as a primary slide wire resistance, a slide associated with said resistance, a second resistance means mounted on said shaft and adapted to function as the galvanometer compensation slide wire resistance, a gear on said shaft operatively associated with a pinion gear adapted to be manually actuated to simultaneously move the scale and the first and second resistances as a single unit, a slide associated with said resistance, a moving galvanometer coil suspended over said first resistance and electrically connected to both said resistances and slides, a pointer associated with and actuated by said galvanometer and having a portion adapted to travel over the surface of said scale, and a fixed zero index means for the scale so arranged so as to coincide with the zero or point of no deflection of the galvanometer pointer.

The device herein disclosed is capable of receiving various mechanical expressions without departing from the spirit of the invention itself; and, for the purpose of describing the invention, there is illustrated in the accompanying drawings one form of the apparatus, in which:

Fig. 1 is a front view of a characteristic housing for my device, in elevation, and Fig. 2 is a front view, in elevation, of the improved potentiometer and galvanometer means, removed from the housing, with associate indexes and appurtenant parts, and having the electric circuits disclosed thereabout, diagrammatically, for clearness in showing.

In the accompanying drawings, like characters of reference indicate the same parts in the different views. The device comprises a circular, potentiometer slide wire carrying index sleeve, denoted by 8, which is affixed to a rotatably mounted vertical shaft 2, the latter being supported, for rotation, in alined bearings 5 and 6, said bearings outstanding horizontally from a wall plate 1, which is provided with a plurality of holes a, to permit of attaching to the housing 40 and a wall, by screws, not shown.

The dielectric index carrying sleeve dial 8 is relatively fixed to the upper end of shaft 2, Fig. 2, and rotates therewith, the boss 8' thereof resting upon the top face of the upper bearing lug 6.

The lower end of the shaft 2 has fixedly attached thereto a shaft driving gear 3, the lower face of which rests upon top face of lower bearing lug 5, the shaft 2 extending therethrough and mounting an end collar 2' thereon, to hold shaft against endwise movement.

The lower bearing 5 has an offset auxiliary bearing 5' into which is rotatably mounted a pinion shaft 13, with a pinion 4 fixed thereto on the upper fact of bearing 5' and a knurled adjusting knob 14 fixed to the lower end thereof against the lower face of bearing 5'. The pinion 4 meshes with gear 3 and rotation of the knob 14 causes shaft 2 to rotate and with it the above described assembly and, also, the following noted structure.

The shaft 2 also has fixedly carried thereon for rotation thereby a dielectric annulus 7 which mounts in a suitable manner upon the grooved periphery thereof, a galvanometer compensation resistance means 23, the function of which will be later described. The foregoing shaft mounted structures and moving means constitute the manipulative control for the instrument. The dial sleeve 8 has mounted near its upper edge a circumferential index scale 17 which is calibrated as at 19, with indicia, to indicate desired units or values of such physical properties, such as temperature, as are being measured.

The dial sleeve 8 also mounts, below the index scale 17, an electrical resistance 20, which is mounted and secured to the face of sleeve 8 similar to the manner of mounting resistance 23 to annulus 7. The function of this resistance is to act as a primary or potentiometer circuit control means, the detail of which will be later described.

Mounted upon the wall bracket 1 is an outstanding boss b upon which is attached a fixed, potentiometer resistance contact slide 9, between which and the boss b is mounted an insulator base c.

Similarly, the galvanometer compensation resistance 23 is also served by a similar contact slide 22, mounted upon an insulated support b—c. Both slides or brushes 9 and 23 are angular in contour, and are offset, except as to their contact ends to clear the operative diameters of their respective resistances.

The galvanometer 10, of the moving coil type, is shown in Fig. 2, in diagrammatic form and in relative operative association with the foregoing described apparatus, and as a part of the diagrammatic circuits shown in conjunction with the instrument. Any suitable mounting of the galvanometer 10, by its bearing pivots 11—11 may be used. The galvanometer carrier in, and actuates, by one of its pivots 11, a galvanometer pointer or indicator 12, and during the oscillation of the galvanometer, by deflection, about its axis which coincides with the axis of shaft 2 and the sleeve scale 8, the pointer 12 will move in associate relation to the index 17. The tip of pointer 12 may be bent at right angles, as at 15, to enable it to be readily visible at the reading face of index 17.

It is understood the foregoing description as to the mounting of the galvanometer and pointer relates to the form disclosed, and that the means of mounting the galvanometer and its pointer may be modified. In some forms of structure the galvanometer may be mounted by either suspension or a monopivot, as desired. The pointer may also be modified in its associate relation to the galvanometer by being attached to the moving coil or the suspension means of the galvanometer or to any means whereby the galvanometer itself may be operatively mounted for desired action.

The upper bearing 6 carries an extension lug 21 on its front face upon which is mounted, in a position to be prominent, but to clear the scale sleeve diameter, a fixed pointer or zero indicator 24, the upper end of which is pointed and is visibly related to the lower line of the index 17. The function of this fixed zero point is to act as a galvanometer zero reference when the galvanometer and its pointer 15 are at a position of no deflection and also as a scale indicator to index 17. From this point 24 the setting of the indicia 19 are read. Thus, the index 17—19 serves for both slide wire scale and galvanometer scale readings, obviating the necessity of two scales or indexes and permitting instant reading on a single index, of joint functions.

As is well known in present instruments of the semi-potentiometer types, the object of the compensation slide wire 23 is to keep the resistance of the galvanometer circuit a constant for any setting of the potentiometer slide wire 20, or for any setting of the rheostat 25. From the properties of the potentiometer, the galvanometer is now able to deflect in proportion to the difference between the potential difference of the potentiometer and the E. M. F. of the thermocouple 26, the difference being interpreted into temperature.

As shown in Fig. 2, the compensation slide wire 23 is connected by a flexible coil extension 27 to a galvanometer calibration coil 28, and the usual thermocouple 26. A single pole, double throw switch 29 is interposed in the circuit between the galvanometer coil 10 and its connection 36 and a standard cell series coil 30 and the thermocouple 26.

The coil 30 is connected to a standard cell 31 and a source of potential 34, by a conductor 33, which has interpolated therein, in series, a source of electric potential 34. The line 33 has therein a compensated resistance 25, known as a receiver shunt, one side of which 38 is shunt-connected to by-pass source 34, and the other side of which is connected to line 32, this latter in turn completing the circuit return to the galvanometer coil 10 on its opposite connection to conductor 36.

It should be understood, however, that a compensated rheostat is not always essential in all circuits. The rheostat may be a simple one, and the instrument may be made to function within the prescribed precision.

The object of the foregoing arrangement is to keep the resistance between $e$ and $f$ constant for any rheostat adjustment so that in the analysis of the potentiometer, the resistance of the rheostat appears in the expression of the galvanometer circuit resistance, as a constant.

The primary slide wire 20 is connected by a flexible connection 39 to line 32, and at its opposite end to conductor 35 by a flexible connection 46, conductor 35 being connected to an extension coil 47, this in turn being connected to line 33, between the source 34 and the standard cell 31. The primary contact slide 9 and the compensating slide contact 22 are connected by a line 37 to each other, thus completing the potentiometer circuit.

As stated above, annulus 7, dial sleeve 18 and index 17 rotate as a unit, the function of the resistance 23 on member 7 being to algebraically add an ohmic resistance to the galvanometer circuit, equal and opposite to the change in ohmic resistance due to different positions of the brush position, so that the sum of the changes is zero, thus keeping the circuit resistance constant.

Now, the relation of the resistance to be algebraically added, and the resistance between two brush positions on the potentiometer slide wire, is not linear. Hence, the shape of the wire 23 will not necessarily be a true circle, but may be a curve of gradually varying radius sector. Or, it may be circular, with a resistance winding of irregular winding pitch. Still other means may be used to accomplish the required compensation.

The galvanometer coil 10 is calibrated by means of the coil 28 so that changes in the quantity to be measured, through the furnace thermocouple 26 in this case, are indicated by deflections on either side of the index 24, and these changes automatically add algebraically to the reading on the scale 19 at the point of setting at the index 24. Thus, the galvanometer pointer 15 always indicates the measurable quantity, as temperature in this case, in one observation, without manipulation.

The standard cell circuit shown is the conventional connections used to indicate when the current in the potentiometer slide wire has the value for standardization, the regulation being accomplished by the compensated rheostat 25.

In Fig. 1 there is shown a view which gives the appearance that the outside of this type of instrument would assume. It is understood, of course, that the mechanism may be arranged in the housing or case 40 in any desirable manner, utilizing the wall plate as a means to attach the housing thereto. As shown, the scale 19 is positioned for movement relative to the sight opening 41. The bent end 15 of the galvanometer pointer is also viewed through the opening 41. The exposed knurled knob 14 is used to bring the galvanometer pointer into view, when the latter deflects out of view.

The pointer of the galvanometer deflecting plus and minus from zero (that is the slide wire scale setting) by its deflection gives a rough indication. Accurate readings are obtained by adjusting the slide wire member 18, using the knob 14, thus bringing the pointer 15 to coincide with zero point 24.

Thereafter the operator or user may observe and read direct from the scale 19 at the position of the galvanometer pointer 15, the actual temperature (even when there are minor variations of the electrical values) being measured, without further slide wire adjustment.

It should be noted that the zero point 24 may also serve as a no-deflection point when checking the battery circuits with the standard cell 31, and also for setting mechanical (open circuit) zero of the galvanometer.

Three knobs 44 are provided on the housing to vary other adjustable portions of the circuit. One of these knobs 44 may be associated with an electrical cold junction compensation, not shown, which is employed in a pyrometer of the type shown, but which can readily be omitted. Battery connections 45, one of which may be used in connection with the cold junction compensation referred to, are also provided.

It is, of course, admitted and understood that readings taken in the manner stated above, when the galvanometer is deflected may be only approximate and not exact. This is so since the deflection of the galvanometer for a given variation, from slide wire setting, of the quantity measured will not be the same when large quantities are measured, as when small total quantities are measured.

However, by arrangement of design, either by length of galvanometer pointer or otherwise, the values of the galvanometer deflection can be made to nearly coincide with the values of the slide wire calibration. Thus, the measurement read when the galvanometer is deflected, will be exact enough for many purposes and uses, besides being extremely convenient and simple in use.

The invention disclosed herein is applicable to devices other than electrical measurement instruments or pyrometers. It is applicable to automatic regulating and controlling and automatic signalling devices which employ potentiometric electrical measuring principles, and which utilize galvanometer deflection to initiate, through associated mechanism, controlling or regulating action.

For example, the invention can be employed with a potentiometric automatic temperature controller if used in connection with the novel galvanometer for exploring the position of the pointer and maintaining regulation of the physical value being measured under the control of the galvanometer deflection. The combined scale 19 operates similarly, both for a simple indicating instrument, as shown in Fig. 1, and for a controller type of instrument.

In this controller application, the operator or supervisor can quickly and conveniently read minor deflections from the temperature at which the scale 19 is set for control. This obviates the need for disturbing the setting, as would be necessary in prior instruments employing a separate, uncalibrated deflection scale for the galvanometer, or the need for making a calculation, but separated galvanometer deflection scale.

When thus employed, the present invention adds the advantage of convenient direct indication of the temperature, to the other functions of the instrument, without the necessity of disturbing the slide wire member, this setting being also capable of functioning as the setting of the controlling, regulating or signalling function.

The foregoing detailed description has been given for clearness of understanding. Hence, no unnecessary limitations should be understood. Further, the appended claims should be construed as broadly as permissible in view of the prior art, since many and various changes may be made without departing from the scope of the invention as defined in the broader claims.

Having thus described my invention what I claim is:

1. The combination of a semi-potentiometer measuring instrument comprising a deflecting galvanometer and a slide wire, with a common reading index therefor.

2. The combination with a potentiometer, comprising a galvanometer, a primary slide wire, and a galvanometer compensation slide wire, of a combined slide wire and galvanometer scale therefor.

3. A potentiometer comprising, with a deflection galvanometer, a circular primary slide wire, a galvanometer compensation slide wire concentric therewith, and a combined circular slide wire and galvanometer reading scale concentric with said slide wires.

4. A potentiometer comprising a deflecting galvanometer coil, an indicator carried thereby, circular primary and compensating slide wires electrically associated with said coil, means for moving said wires, and a combined galvanometer and slide wire reading scale concentric with said indicator and said wires.

5. An electrical measuring instrument, employing a deflection potentiometer circuit in which the slide wire is of circular form, in combination with a fixed galvanometer whose scale is carried in combination by said circular potentiometer slide wire, said slide wire and scale being rotatable about the axis of said fixed galvanometer, and a fixed index for said galvanometer scale.

6. An electrical measuring instrument employing a deflection potentiometer circuit the slide wire of which is of circular form with a scale attached thereto, in combination with a fixed galvanometer mounted coaxially to said slide wire, the pointer of said galvanometer playing over said slide wire scale and said slide wire and scale being rotatable as a unit.

7. In a measuring instrument, the combination of a balancing means comprising a pair of relatively movable parts one of which carries a scale and the other a pointer; said balancing means including means associated with the scale for approximately indicating on the scale what point on the scale should register with the index to obtain a balance.

8. An instrument comprising a balancing means having a movable part adapted to be moved to balance the force of a function of a quantity to be measured; a scale movable with said part; and a fixed index associated with said scale; said balancing means including a pointer associated with said scale and disposable opposite said index, and deflecting, when the balancing means is unbalanced, to approximately indicate what point on the scale could be brought to the pointer to obtain a balance.

9. A deflection potentiometer comprising a pair of relatively movable supports; a slide wire and a scale carried on one of said supports; the other support carrying an index associated with said scale, and a galvanometer having a pointer associated with the scale and index; said scale being a common scale to both the slide wire and the pointer.

10. A deflection potentiometer comprising a pair of relatively movable supports; a slide wire and a scale carried on one of said supports; the other support carrying an index associated with said scale, and a galvanometer having a pointer associated with the scale and index; said scale being calibrated and disposed relative to the index to give direct reading of the quantity to be measured when the potentiometer is balanced; said pointer being opposite the index when the potentiometer is balanced; said member, when the potentiometer is slightly unbalanced deflecting and indicating on the scale an approximate reading of the quantity to be measured.

11. A deflection potentiometer comprising, a slide wire and a scale movable together; a fixed index associated with said scale; a galvanometer having a pointer associated with the scale and index, said pointer being opposite the index when the potentiometer is balanced; said member when the potentiometer is unbalanced deflecting from the index an amount substantially equal to the difference between the amount to be measured and the amount indicated by the index on the scale.

12. A deflection potentiometer comprising, a slide wire and a scale movable together; a fixed index associated with said scale; a galvanometer having a pointer associated with the scale; said scale being calibrated and disposed relative to the index to give direct reading of the quantity to be measured when the potentiometer is balanced; said pointer being opposite the index when the potentiometer is balanced; said pointer, when said quantity is in excess of balancing amount, deflecting toward the higher end of the scale an amount substantially equal to the scale-units indicating such excess; said pointer, when said quantity is less than balancing amount, deflecting toward the lower end of the scale an amount substantially equal to the scale-units indicating the deficiency.

13. A deflection potentiometer comprising a slide wire and a scale oscillatory together; a fixed index associated with said scale; a fixed galvanometer having a pointer associated with the scale and movable on an axis coincident with the axis of oscillation of said scale and wire; said pointer being opposite the index when the potentiometer is balanced; said pointer, when the potentiometer is unbalanced, deflecting from the index an amount substantially to indicate a point on the scale to be brought to the index for an accurately balanced reading.

14. A deflection potentiometer comprising a pair of relatively oscillatory supports; a slide wire and a scale carried on one of said supports; the other support carrying an index associated with said scale and a galvanometer having a pointer associated with the scale and movable on an axis coincident with the axis of relative oscillation of said supports; said scale being calibrated and disposed relative to the index to give direct reading of the quantity to be measured when the potentiometer is balanced; said pointer being opposite the index when the potentiometer is balanced; said pointer, when said quantity is different from the balancing amount, deflecting from the index an amount algebraically substantially equal to the scale-units indicating the difference; whereby the amount to be measured is substantially indicated on the scale by the pointer as an approximate final reading or as a reading indicating the point on the scale to be brought to the index for an accurately balanced reading.

15. A potentiometer comprising a pair of relatively movable supports; a potentiometer slide wire, a compensating slide wire parallel thereto and a scale carried on one of said supports longitudinal to the direction of relative movement; the other support carrying an index associated with said scale, a galvanometer having a pointer associated with the scale, and a pair of contactors engaging said wires respectively; a current source of constant potential and constant internal resistance having its poles respectively connected to the ends of the potentiometer wire; a source of potential variable as a function of a quantity to be measured; conductors connecting said source of potential and galvanometer in series between one end of the compensating wire and the opposite end of the potentiometer wire; said scale being calibrated and disposed relative to the index to give direct reading of the quantity to be measured when the potentiometer is balanced and no current passes the galvanometer; said deflector member being opposite the index when the potentiometer is balanced and, when said quantity is different from balancing amount, deflecting from the index an amount substantially equal to the scale units indicating such difference.

Signed at New York, in the county of Bronx and State of New York, this 9th day of November, A. D. 1928.

SIDNEY C. HORN.